UNITED STATES PATENT OFFICE.

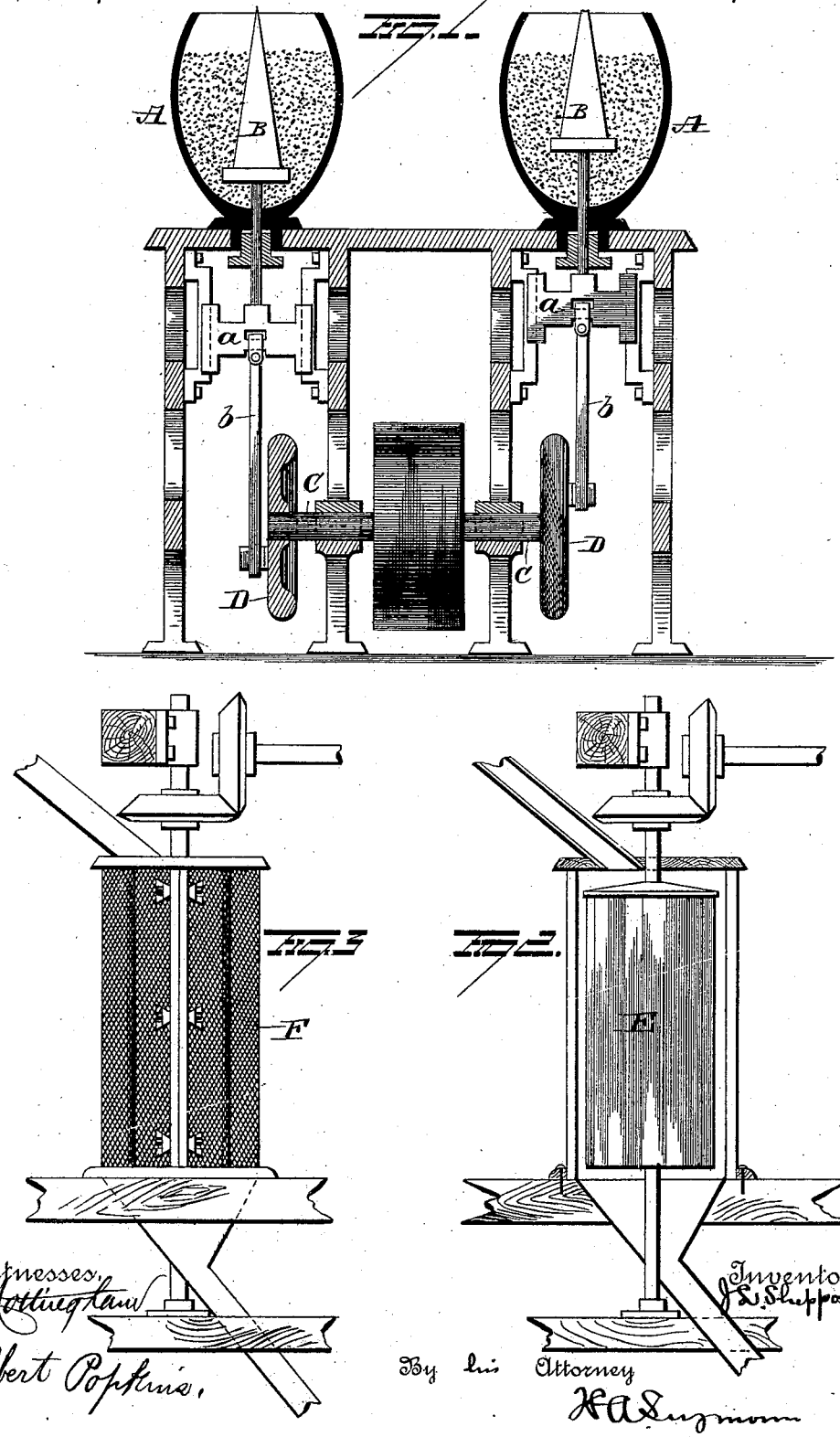

JOHN L. SHEPPARD, OF CHARLESTON, SOUTH CAROLINA, ASSIGNOR OF ONE-HALF TO WILMOT D. PORCHERS, OF SAME PLACE.

PROCESS OF MILLING RICE.

SPECIFICATION forming part of Letters Patent No. 397,944, dated February 19, 1889.

Application filed November 16, 1888. Serial No. 291,044. (No model.)

*To all whom it may concern:*

Be it known that I, JOHN L. SHEPPARD, of Charleston, in the county of Charleston and State of South Carolina, have invented certain new and useful Improvements in the Process of Milling Rice; and I do hereby declare the following to be a full, clear, and exact description of the invention, such as will enable others skilled in the art to which it appertains to make and use the same.

My invention relates to an improvement in the process of milling rice.

The object is to harden, toughen, and whiten the grain, to reduce the amount of breakage in milling, and produce a finished and highly-polished article.

With this end in view my process consists in removing the chaff or hull in the ordinary manner and by the usual means, but some time in advance of the further milling, and in mixing common salt with the hulled rice when it has sufficiently hardened and when it is carried to the mortar, then agitating and pounding the mixture, separating the rice from the meal or flour, and finally polishing it.

In the accompanying drawings, Figure 1 is a sectional view of an approved form of pestle-and-mortar machine for pounding the rice; and Figs. 2 and 3 are views of the polisher, one showing the drum exposed and the other showing the wire case.

It is proposed to operate upon all kinds of rice, the rice mostly handled up to this time being the foreign cereal coming principally from Japan. This rice has the chaff or hull removed before exportation, and is known by the Japanese as "brown rice." The removal of the hull some time in advance of the removal of the inner skin or cuticle not only hardens and toughens the grain, but it also dries the moisture out of the cuticle and hardens it, making it the more difficult to remove. When the hulled rice has sufficiently hardened to stand the further processes of milling without being broken by the punishment which it is to receive, it is conveyed to the mortars A to expedite the removal of the cuticle. Pestles or plungers B are reciprocated up and down in these mortars alternately at the speed of about one hundred and seventy-five or one hundred and eighty strokes per minute. These are driven by means of shaft C, having combined balance and crank wheels D on its ends, which are connected with the pestles by slide-blocks $a$ and links $b$. To whiten the grain, common salt is then mixed with it in about the proportion, say, of four quarts (more or less) of salt to ten bushels of hulled rice. After pounding or beating with a pestle for about eighty minutes the mixture is removed to the screens and the rice is separated from the meal. The rice, having had the cuticle separated from it by the pounding process, is now carried by machinery (not shown) to the polishers or brushes. (Shown in Figs. 2 and 3.) These consist of upright rotating drums E, covered with sheep or other skin, and inclosed in a removable wire casing, F. The drums preferably revolve at the rate of about two thousand or more feet per minute. The centrifugal force carries the grain outward and against the wire casing, where the skin flaps on the drums wipe the rice along and around inside the casing, thus polishing it. The rice gradually, by force of gravity, drops out of the brushes, coming out at the lower end of the casing. The portion of the loose meal going into the brushes along with the rice and that small portion of the cuticle not removed by the pounding process are brushed off clean by the action of the brushes, and are forced out into the polishing or brush room through the wire casing. This meal, being rather finer than that pounded off and separated, may be kept separate, and is known and sold as "polish." Usually, however, it is carried by means of screw conveyers to the meal or flour house and mixed with the coarse meal produced by the pounding process.

The polishing or brushing process removes all of the salt from the rice, the salt being left in the meal or flour and in the polish, thus improving these two products and making them more desirable for food for cattle.

Besides furnishing moisture to loosen and soften the cuticle, the salt also really makes the rice whiter, so that after it has been through this process a presentable, palatable, and marketable article has been prepared in a simple and inexpensive manner.

Having fully described my invention, what

I claim as new, and desire to secure by Letters Patent, is—

1. The herein-described process of milling grain, consisting in mixing salt with the grain and then pounding the mixture, substantially as set forth.

2. The herein-described process of milling rice, consisting in removing the hull some time in advance of further milling, then mixing in common salt, and finally pounding the mixture, substantially as set forth.

3. The herein-described process of milling rice, consisting in removing the hull some time in advance of further milling, then mixing in common salt, pounding the mixture, and finally polishing it, substantially as set forth.

4. The herein-described process of milling rice, consisting in removing the hull some time in advance of further milling, then mixing in a quantity of common salt when the hulled rice is sufficiently hardened, beating and pounding the mixture, separating the meal or flour from the rice, and finally separating the salt from the polished rice, substantially as set forth.

In testimony whereof I have signed this specification in the presence of two subscribing witnesses.

JOHN L. SHEPPARD.

Witnesses:
W. B. MINOTT,
J. C. DILLINGHAM.